United States Patent
Kerth

(10) Patent No.: US 10,774,746 B2
(45) Date of Patent: Sep. 15, 2020

(54) SYSTEMS AND METHODS FOR COOLING COMPONENTS OF A GAS TURBINE

(71) Applicant: DRESSER-RAND COMPANY, Olean, NY (US)

(72) Inventor: Jason M. Kerth, Houston, TX (US)

(73) Assignee: DRESSER-RAND COMPANY, Olean, NY (US)

( * ) Notice: Subject to any disclaimer, the term of this patent is extended or adjusted under 35 U.S.C. 154(b) by 266 days.

(21) Appl. No.: 15/902,488

(22) Filed: Feb. 22, 2018

(65) Prior Publication Data

US 2019/0010869 A1 Jan. 10, 2019

Related U.S. Application Data

(60) Provisional application No. 62/530,527, filed on Jul. 10, 2017.

(51) Int. Cl.
*F02C 6/16* (2006.01)
*F02C 7/18* (2006.01)
*F02C 9/18* (2006.01)

(52) U.S. Cl.
CPC ............... *F02C 7/18* (2013.01); *F02C 6/16* (2013.01); *F02C 9/18* (2013.01); *F05D 2220/3213* (2013.01); *F05D 2260/20* (2013.01)

(58) Field of Classification Search
CPC ...... F02C 9/18; F02C 6/08; F02C 7/18; F02C 7/185; F02C 6/16
See application file for complete search history.

(56) References Cited

U.S. PATENT DOCUMENTS

| | | | | |
|---|---|---|---|---|
| 3,989,410 A | * | 11/1976 | Ferrari | F01D 3/00 415/115 |
| 4,158,145 A | * | 6/1979 | Kartsounes | F02C 3/28 290/52 |
| 4,275,310 A | * | 6/1981 | Summers | F01K 21/04 290/1 R |
| 5,414,992 A | * | 5/1995 | Glickstein | B64D 13/006 60/39.83 |
| 6,038,849 A | * | 3/2000 | Nakhamkin | F02C 6/06 60/726 |
| 7,810,332 B2 | * | 10/2010 | Olmes | F02C 3/22 60/39.17 |
| 7,954,330 B2 | * | 6/2011 | Althaus | F01K 23/10 60/39.5 |
| 8,261,552 B2 | * | 9/2012 | Nakhamkin | F01K 3/12 60/659 |
| 2003/0131599 A1 | * | 7/2003 | Gerdes | F02C 6/16 60/727 |

(Continued)

*Primary Examiner* — William H Rodriguez

(57) ABSTRACT

Systems and methods for cooling one or more components of a gas turbine are provided. One system may include an expansion device and one or more conduits. The expansion device may be operatively coupled to the gas turbine and configured to convert a pressure drop of a stream of compressed process fluid to mechanical energy. The expansion device may be further configured to at least partially drive the gas turbine with the mechanical energy. The one or more conduits may fluidly couple the expansion device and the gas turbine. The one or more conduits may be configured to direct an expanded stream of the compressed process fluid to the one or more components of the gas turbine to cool the one or more components.

17 Claims, 2 Drawing Sheets

(56) References Cited

U.S. PATENT DOCUMENTS

| | | | | |
|---|---|---|---|---|
| 2010/0083660 A1* | 4/2010 | Nakhamkin | ............... | F02C 6/16 |
| | | | | 60/652 |
| 2012/0247124 A1* | 10/2012 | Shapiro | ..................... | F01D 9/04 |
| | | | | 60/805 |
| 2014/0137563 A1* | 5/2014 | Kerth | ......................... | F02C 6/16 |
| | | | | 60/772 |
| 2015/0275769 A1* | 10/2015 | Foutch | ...................... | F02C 9/18 |
| | | | | 60/776 |
| 2017/0009986 A1* | 1/2017 | Patel | ......................... | F23R 3/50 |
| 2017/0108221 A1* | 4/2017 | Mizukami | ................. | F23R 3/06 |

* cited by examiner

SYSTEMS AND METHODS FOR COOLING COMPONENTS OF A GAS TURBINE

BACKGROUND

Gas turbines are commonly used to drive generators for power generation and/or to drive process equipment such as compressors or pumps. To drive the process equipment and/or the generators, gas turbines may receive and compress motive air in a compressor, combust the compressed motive air with fuel in a combustor to produce a combusted motive gas, and expand the combusted motive gas through a power turbine. Generally, it is necessary to provide one or more cooling flows to keep certain components of the gas turbine (e.g., metal components of the combustor and/or power turbine) within acceptable temperature ranges.

Typically, air may be utilized to provide the cooling, and the cooling air is derived from the compressor at one or more stages thereof and ported to the combustor and/or power turbine either internal or external to the gas turbine. In the event that it is desired to operate a combustor and power turbine that is not coupled directly to and integrated with the compressor, such as would be the case in a compressed air energy storage (CAES) system, the cooling flows directed to the combustor and/or power turbine may be provided by other cooling sources and process components, such as, for example, heat exchangers. However, the use of these cooling sources and process components may lead to losses in efficiency.

What is needed, therefore, is an efficient system and method for cooling components of a gas turbine not integrally coupled with the compressor thereof.

SUMMARY

Embodiments of the disclosure may provide a gas turbine assembly. The gas turbine assembly may include a gas turbine, an expansion device, and a plurality of conduits. The gas turbine may include a combustor and a power turbine. The combustor may be configured to receive a first stream of a compressed process fluid, mix a fuel with the first stream of the compressed process fluid to form a mixture, and combust the mixture to form a combustion product. The power turbine may be configured to receive and expand the combustion product to convert a pressure drop of the combustion product to mechanical energy. The expansion device may be configured to receive and expand a second stream of the compressed process fluid to convert a pressure drop of the second stream of the compressed process fluid to mechanical energy. The expansion device may be operatively coupled to the power turbine and configured to at least partially drive the power turbine with the mechanical energy converted from the pressure drop of the second stream of the compressed process fluid. The plurality of conduits may fluidly couple the power turbine and the expansion device and may be configured to direct the second stream of the compressed process fluid expanded in the expansion device to the power turbine to cool one or more components of the power turbine.

Embodiments of the disclosure may further provide a system for cooling one or more components of a gas turbine. The system may include an expansion device and one or more conduits. The expansion device may be operatively coupled to the gas turbine and configured to convert a pressure drop of a stream of compressed process fluid to mechanical energy. The expansion device may be further configured to at least partially drive the gas turbine with the mechanical energy. The one or more conduits may fluidly couple the expansion device and the gas turbine. The one or more conduits may be configured to direct an expanded stream of the compressed process fluid to the one or more components of the gas turbine to cool the one or more components.

Embodiments of the disclosure may further provide a method for cooling one or more components of a gas turbine. The method may include splitting a compressed process fluid into a plurality of streams including a first stream of the compressed process fluid and a second stream of the compressed process fluid. The method may also include directing the first stream of the compressed process fluid to a gas turbine, and directing the second stream of the compressed process fluid to an expansion device operatively coupled to the gas turbine. The method may further include expanding the second stream of the compressed process fluid in the expansion device to at least partially drive the gas turbine, and directing an expanded second stream of the compressed process fluid to the gas turbine. The method may also include cooling the one or more components of the gas turbine with the expanded second stream of the compressed process fluid.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
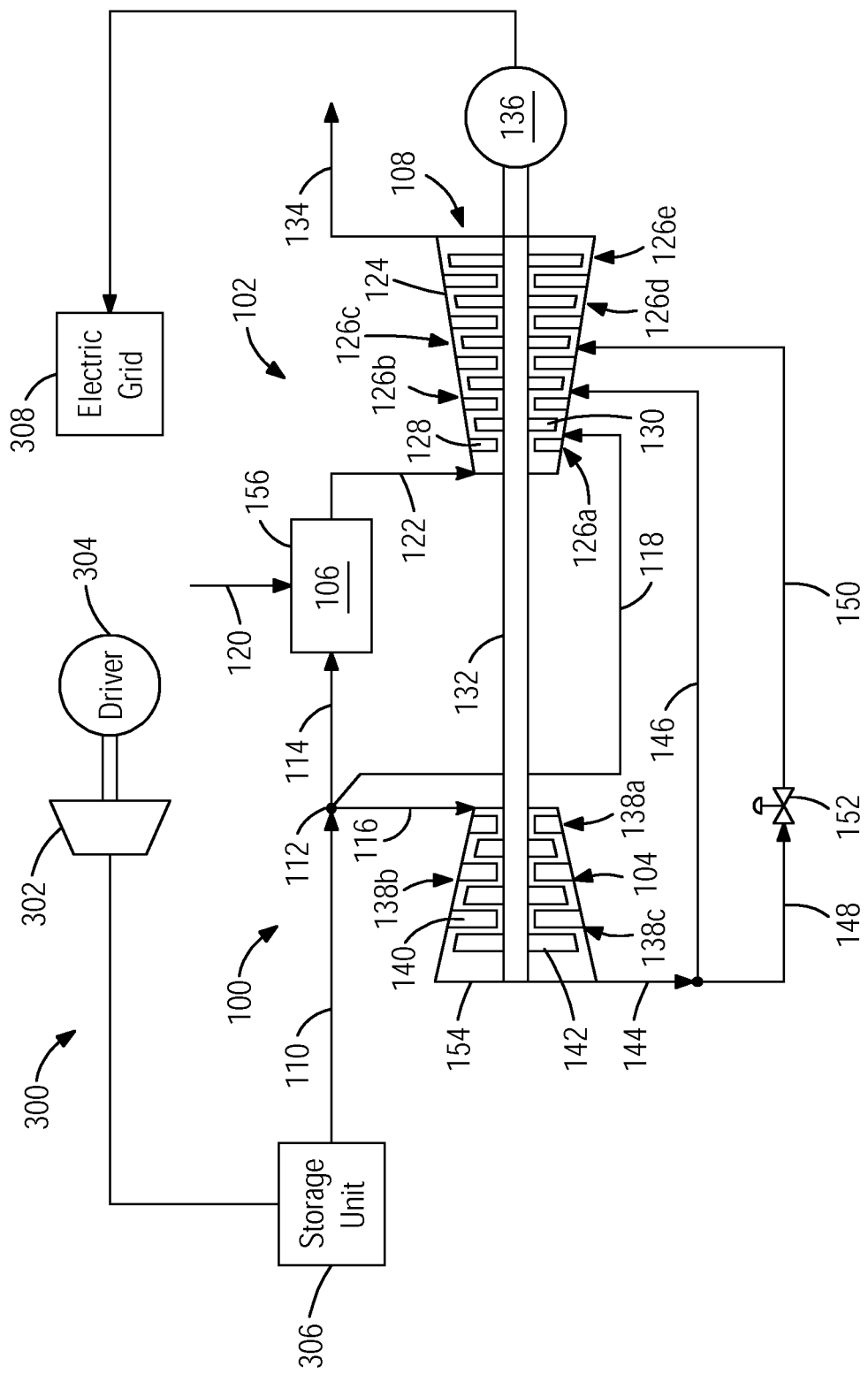
FIG. 1 illustrates a schematic of an exemplary gas turbine assembly, according to one or more embodiments of the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a schematic of an exemplary gas turbine assembly 100, which according to one or more embodiments of the disclosure may be adapted to operate in an industrial process system, such as may involve a compressed air energy storage (CAES) system 300 that includes a compressor 302. The gas turbine assembly 100 may include a gas turbine 102 operatively coupled to an expansion device 104 and uncoupled from compressor 302 of CAES system 300. The gas turbine assembly 100 may further include a combustor 106, and a power turbine 108. Although as noted above, gas turbine 102 may be adapted to operate with CAES system 300, it will be appreciated that the present disclosure is not limited thereto, and the gas turbine 102 may be adapted to operate in other industrial process systems. For example, in one or more industrial process systems, the combustor 106 as disclosed herein may be replaced with a heat source including, but not limited to, a fuel cell, an exothermic reaction process, a radiative heat transfer process, and an indirect heat exchange process including a waste heat stream.

Accordingly, as shown in FIG. 1, compressor 302 of CAES system 300 may be detached from the remainder of the gas turbine 102 and may be operatively coupled to a separate driver 304 and utilized to compress a process fluid during off-peak hours prior to storing the compressed process fluid in a storage unit 306. In one or more embodiments, the storage unit 306 may be a cavern or vessel. For example, the storage unit 306 may be a rock cavern, a salt cavern, an aquifer, an abandoned mine, a depleted gas field, a container stored underwater or above ground, or the like.

In at least one embodiment, the process fluid may be ambient air. The compressor 302 may be a supersonic compressor, a centrifugal compressor, an axial flow compressor, a reciprocating compressor, a rotating screw compressor, a rotary vane compressor, a scroll compressor, a diaphragm compressor, or the like. The driver 304 operatively coupled to and adapted to drive the compressor 302, may be a motor, such as a permanent magnetic electric motor, and may include a stator (not shown) and a rotor (not shown). It should be appreciated, however, that other embodiments may employ other types of motors including, but not limited to, synchronous motors, induction motors, and brushed DC motors, or the like. The driver may also be a hydraulic motor, an internal combustion engine, a steam turbine, a gas turbine, or any other device capable of driving the compressor. In at least one embodiment, the driver 304 and compressor 302 may be disposed together in a hermetically sealed casing (not shown).

A feed line 110 may provide fluid communication from an upstream component (e.g., the storage unit) to an inlet 112 of the gas turbine assembly 100. For example, in the CAES system during peak hours, the compressed process fluid stored in the storage unit may be directed to the gas turbine assembly 100 via the feed line 110. In one or more embodiments, a preheater (not shown) may be fluidly coupled to the feed line 110 and configured to heat the compressed process fluid prior to the compressed process fluid entering the inlet 112 of the gas turbine assembly 100.

The inlet 112 of the gas turbine assembly 100 may be configured to separate the compressed process flow into a plurality of streams. In one or more embodiments, the inlet 112 of the gas turbine assembly may be configured to separate the compressed process flow into a first stream, a second stream, and a third stream; however, the disclosure is not limited thereto, and in other embodiments, the inlet 112 of the gas turbine assembly 100 may be configured to separate the compressed process flow into two streams, four streams, five streams, or more.

As shown in FIG. 1, the inlet 112 of the gas turbine assembly 100 may be further configured to direct the first stream of the compressed process fluid to the combustor 106 via line 114, the second stream of the compressed process fluid to the expansion device 104 via line 116, and the third stream of the compressed process fluid to the power turbine 108 via line 118. In one or more embodiments, the mass flow rate of the first stream of the compressed process fluid is greater than the mass flow rate of the second stream of the compressed process fluid and the third stream of the compressed process fluid. Generally, in one or more embodiments, the mass flow rate of each of the first stream, the second stream, and the third stream of the compressed process fluid may be based on the inlet pressure of the combustor 106, the expansion device 104, and the power turbine 108.

The combustor 106 may be configured to receive the first stream of the compressed process fluid, mix the first stream of the compressed process fluid with a fuel supplied from a fuel source (not shown) via line 120 to form a mixture, and subsequently burn the mixture to produce a combustion product. The combustion product may be directed to the power turbine 108 fluidly coupled thereto via line 122. Although not illustrated, in one or more embodiments, the combustor 106 and the power turbine 108 may be disposed together in a gas turbine housing 124, thereby being disposed in fluid communication with one another via one or more flow passages defined in the gas turbine housing 124.

The power turbine 108 may be configured to receive the combustion product from the combustor 106 and to expand the combustion product, thereby extracting and converting the energy from the combustion product into mechanical energy. To that end, the power turbine 108 may have one or more stages (five shown 126a-e) through which the combustion product is expanded to convert the energy from the combustion product into mechanical energy. Each stage 126a-e may include a plurality of stationary vanes (one indicated 128) or nozzles configured to direct the combustion product to impact a plurality of rotor blades (one indicated 130) disposed downstream from and axially spaced from the stationary vanes 128. Each of the rotor blades 130 may be coupled to a rotor shaft 132 extending through the power turbine 108. The rotor blades 130 may be configured to rotate the rotor shaft 132 in response to the contact from the combustion product. As the combustion product flows through and is expanded in each stage 126a-e, the pressure and temperature of the combustion product drops accordingly in each stage 126a-e. The power turbine 108 may discharge the combustion product from the power turbine 108 via discharge line 134. The discharge line 134 may be fluidly coupled to a downstream process component (not shown), such as, for example, a cooler or other heat exchanging component.

The rotation of the rotor shaft 132 may provide the rotational energy and the mechanical work capable of driving one or more process components in the industrial process system. As shown in FIG. 1, the power turbine 108 may drive a generator 136. In another embodiment, in addition to or in place of the generator 136, a compressor, pump, or other process component (not shown) may be coupled with the power turbine 108 via the rotor shaft 132 and driven by the power turbine 108.

As shown in FIG. 1, the power turbine 108 may be operatively coupled to the generator 136 via the rotor shaft 132. In one or more embodiments, the generator 136 may have a drive shaft (not shown) integral or coupled with the rotor shaft 132 of the power turbine 108 such that the rotational energy of the rotor shaft 132 may be transmitted to the drive shaft. The drive shaft of the generator 136 may be coupled with the rotor shaft 132 via a gearbox (not shown) having a plurality of gears configured to transmit the rotational energy of the rotor shaft 132 to the drive shaft of the generator 136. Accordingly, the drive shaft and the rotor shaft 132 may spin at the same speed, substantially similar speeds, or differing speeds and rotational directions via the gearbox.

The generator 136 may be configured to convert the rotational energy into electrical energy. The electrical energy may be transferred or delivered from the generator 136 to an electrical grid 308 via a power outlet coupled therewith. Accordingly, in CAES system 300, the generator 136 may generate and supply power to the electrical grid 308 during peak hours. In one or more embodiments, electrical energy may be transferred or delivered from the generator 136 to one or more components (e.g., actuators, controllers, and personnel facilities) in the industrial process system operating via electrical energy.

As shown in FIG. 1, the power turbine 108 may be operatively coupled to the expansion device 104. In one or more embodiments, the rotor shaft 132 may be common to both the power turbine 108 and the expansion device 104. In other embodiments, the power turbine 108 and a drive shaft of the expansion device 104 may be coupled via a coupling or gearbox including one or more gears. Accordingly, the drive shaft and the rotor shaft 132 may spin at the same speed, substantially similar speeds, or differing speeds and rotational directions via the gearbox.

As arranged, the expansion device 104 may be configured to receive the second stream of the compressed process fluid and to expand the second stream of the compressed process fluid, thereby extracting and converting the energy from the second stream of the compressed working fluid into mechanical work in the form of rotational energy. The expansion device 104 may be configured to provide rotational energy to the power turbine 108 via the rotational energy provided to the rotor shaft 132, thereby augmenting the rotational energy generated by the power turbine 108. Accordingly, the expansion device 104 may increase the operating efficiency of the power turbine 108.

The expansion device 104 may have one or more stages (three shown 138a-c) through which the second stream of the compressed working fluid is expanded to convert the energy from the second stream of the compressed working fluid into mechanical work in the form of rotational energy. Each stage 138a-c may include a plurality of stationary vanes (one indicated 140) or nozzles configured to direct the second stream of the compressed working fluid to impact a plurality of rotor blades (one indicated 142) disposed downstream from and axially spaced from the stationary vanes 140. Each of the rotor blades 142 may be coupled to the rotor shaft 132 (or the drive shaft) extending through the expansion device 104 and may be configured to rotate the rotor shaft 132 (or the drive shaft) in response to the contact from the second stream of the compressed working fluid. As the second stream of the compressed working fluid flows through and is expanded in each stage 138a-c, the pressure and temperature of the second portion of the compressed working fluid drops accordingly in each stage 138a-c.

Generally, the combustion product entering the power turbine 108 may have a temperature greater than about 900° C., which without intervention may result in damage or catastrophic failure of one or more components (e.g., stationary vanes 128 and rotor blades 130) of the power turbine 108. In particular, the first stage 126a of the power turbine 108 may be subject to the highest temperature and thus may be most susceptible to damage from the elevated temperature of the combustion product. In addition, other components including, but not limited to, a balance piston and axial thrust bearings (not shown), may be susceptible to damage from the elevated temperature of the combustion product. Generally, as the pressure and temperature of the combustion product drops as the combustion product flows through the respective stages 126a-e of the power turbine 108, the risk of damage is reduced as to each downstream stage 126b-e.

Accordingly, the expansion device 104 may form part of a system configured to cool one or more components of the gas turbine 102 susceptible to damage from the elevated temperature of the combustion product. To that end, the expansion device 104 may be fluidly coupled to the power turbine 108 via one or more conduits (four shown 144, 146, 148, and 150) configured to direct a cooling fluid to one or more components of the power turbine 108 to reduce the temperature thereof. As arranged, each of the conduits 144, 146, 148, and 150 may direct a cooling fluid at a specified pressure and temperature to a respective component of the power turbine 108 to cool the component and to prevent damage thereto from the elevated temperature of the combustion product.

As shown in FIG. 1, the cooling system may include a plurality of conduits 144, 146, 148, and 150 fluidly coupling the expansion device 104 and the power turbine 108. The plurality of conduits 144, 146, 148, and 150 may include a first conduit 146 configured to receive a cooling fluid in the form of the expanded second stream of process fluid discharged from the expansion device 104 at a discharge pressure and temperature. The first conduit 144 may be fluidly coupled with the power turbine 108 via a second conduit 146. In addition, the first conduit 144 may be fluidly coupled with the power turbine 108 via a third conduit 148 and a fourth conduit 150. As arranged, each of the conduits 144, 146, 148, and 150 may be configured to receive at least a portion of the expanded second stream of process fluid.

The second conduit 146 may be fluidly coupled with an intermediate stage 126b of the power turbine 108 and may be configured to direct the portion of the expanded second stream flowing therethrough to an intermediate stage (e.g., second stage 126b) of the power turbine 108 at about the discharge pressure and temperature, where the second stage 126*b* of the power turbine 108 is at a lower pressure than the discharge pressure. At least one of the components (e.g., stationary vanes 128 or rotor blades 130) in the intermediate stage 126*b* may be at a higher temperature than the portion of the expanded second stream introduced thereto. Accordingly, thermal energy from the component(s) may be transferred to the portion of the expanded second stream, thereby cooling the component(s) of the second stage 126*b*.

As shown in FIG. 1, the third conduit 148 may be coupled to a throttle valve 152 to reduce the pressure and temperature of the portion of the expanded second stream flowing therethrough from the discharge pressure and temperature to a lower pressure and temperature, such that a component downstream from the second stage 126*b* may be cooled. In another embodiment, the throttle valve 152 may be replaced with a restrictive orifice or other passive device capable of reducing the pressure and temperature of the expanded second stream. The third conduit 148 may be fluidly coupled with the fourth conduit 150 via the throttle valve 152. The fourth conduit 150 may be fluidly coupled with another intermediate stage (e.g., third stage 126*c*) of the power turbine 108 downstream of the second stage 126*b* and may be configured to direct the portion of the expanded second stream flowing therethrough to the third stage 126*c* of the power turbine 108. At least one of the components (e.g., stationary vanes 128 or rotor blades 130) in the third stage 126*c* may be at a higher temperature than the portion of the expanded second stream introduced thereto. Accordingly, thermal energy from the third stage 126*c* may be transferred to the portion of the expanded second stream, thereby cooling the component(s) of the third stage 126*c*.

The cooling system may further include a conduit (line 118) extending from the inlet 112 of the gas turbine assembly 100 to the power turbine 108 and configured to direct the third stream of the compressed process fluid thereto. As arranged, the conduit (line 118) may be configured to direct the third stream of the compressed process fluid to the power turbine 108 to cool one or more components thereof. As illustrated in FIG. 1, the conduit (line 118) may be fluidly coupled to the power turbine 108 and configured to direct the third stream of the compressed process fluid to the first stage 126*a* of the power turbine 108. The third stream of the compressed process fluid may be at a pressure greater than the pressure of the first stage 126*a* of the power turbine 108 and a temperature less than the first stage 126*a* of the power turbine 108. As such, at least one of the components (e.g., stationary vanes 128 or rotor blades 130) in the first stage 126*a* may be at a higher temperature than the third stream of the compressed process fluid introduced thereto. Accordingly, thermal energy from the component(s) may be transferred to the portion of the third stream of the compressed process fluid, thereby cooling the component(s) of the first stage 126*a*.

The number, location, and characteristics of the conduits 144, 146, 148, and 150 in the cooling system fluidly coupled with the expansion device 104 may vary and may be based in part on the pressure and temperatures of the component(s) to be cooled in the power turbine 108. For example, the components in the respective stages 126*a-e* in the power turbine 108 may be at different temperatures and pressures, thereby defining the pressure and temperature of the cooling fluid provided by the expansion device 104. Thus, orifices of the conduits 144, 146, 148, and 150 may be adjusted to obtain the desired pressure and temperature. Further, the conduits may be fluidly coupled to particular stages of the expansion device 104 to achieve the desire pressures and temperatures. For example, although FIG. 1 shows the final stage 138*c* of the expansion device 104 being fluidly coupled with the power turbine 108, one or more of the conduits 144, 146, 148, and 150 may be fluidly coupled with the power turbine 108 via the first expansion device stage 138*a* and/or an intermediate expansion device stage 138*b*.

Each of the conduits 144, 146, 148, and 150 of the cooling system as shown in FIG. 1 may be connected to the exterior of the gas turbine housing 124 and a housing 154 of the expansion device 104 through orifices that may be adjusted to regulate the pressure of the portion of the expanded second stream flowing therethrough. In one or more embodiments, the expansion device 104 may be disposed in the gas turbine housing 124 and one or more of the conduits 144, 146, 148, and 150 may be entirely contained internally within or defined by the gas turbine housing 124. In another embodiment, one or more of the conduits 144, 146, 148, and 150 may be partially contained in the gas turbine housing 124, such that a portion of the conduit(s) 144, 146, 148, and 150 may be enclosed within or defined by the gas turbine housing 124, and a portion of the conduit(s) 144, 146, 148, and 150 may be disposed external of the gas turbine housing 124. In yet another embodiment, one or more of the conduits 144, 146, 148, and 150 may be at least partially contained in the rotor, such that a portion of the conduit(s) 144, 146, 148, and 150 may be entirely contained internally within the rotor 132 to cool the rotor blades 130.

In one or more embodiments, one or more conduits 144, 146, 148, and 150 of the cooling system may fluidly couple the expansion device 104 with the combustor 106, such that the one or more conduits 144, 146, 148, and 150 may direct a portion of the expanded second stream of the compressed fluid to the combustor 106 to cool the outer housing or combustion liner 156 thereof. In another embodiment, the inlet 112 of the gas turbine assembly 100 may separate the compressed fluid to provide a fourth cooling stream. The fourth cooling stream may be fluidly coupled to the combustor 106 via a conduit (not shown) of the cooling system and configured to cool the outer housing or combustion liner 156 of the combustor 106.

Figure 2:
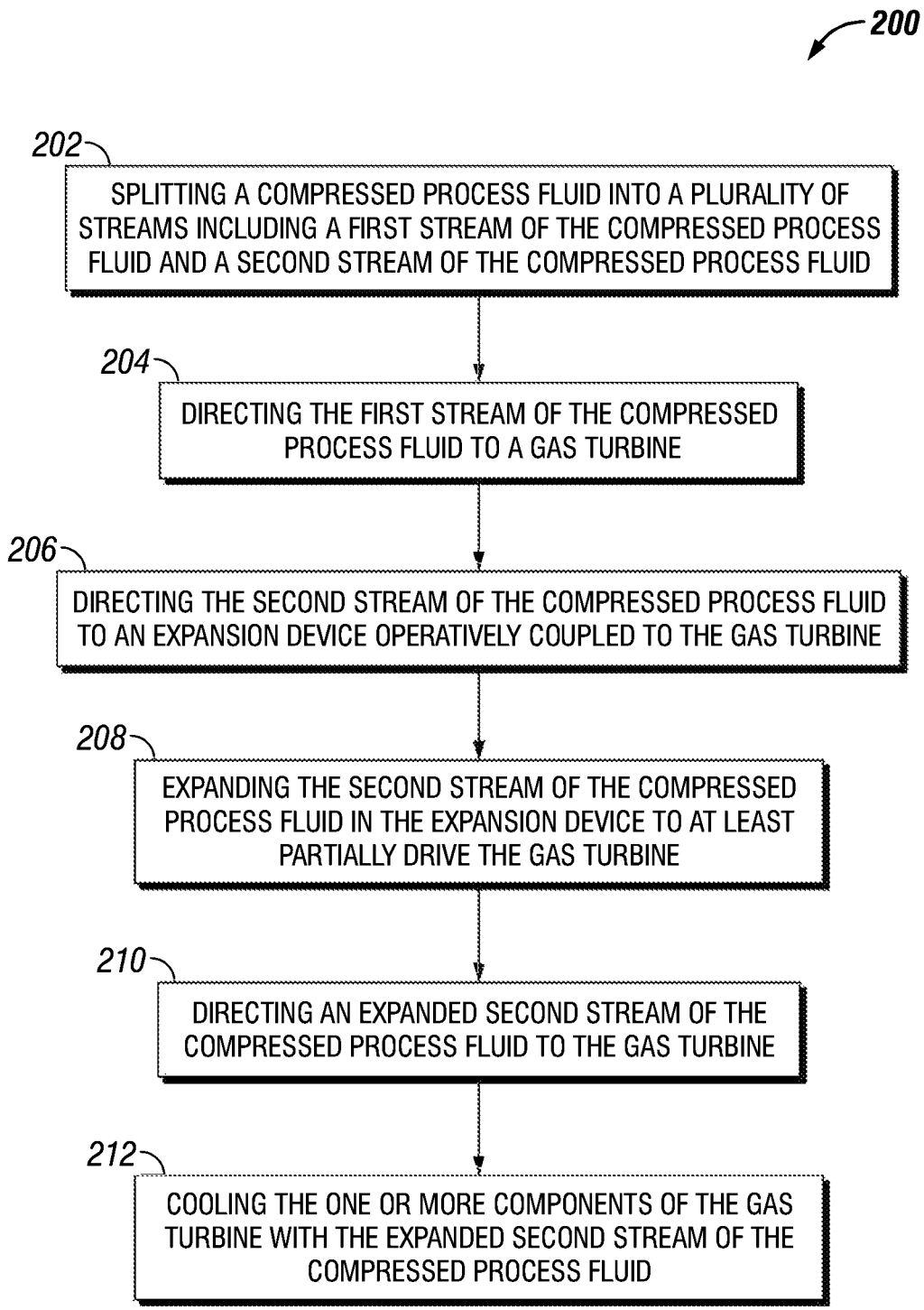
FIG. 2 illustrates a flowchart depicting a method for cooling one or more components of a gas turbine, according to one or more embodiments disclosed.

Turning now to FIG. 2, FIG. 2 illustrates a flowchart depicting a method 200 for cooling one or more components of a gas turbine, according to one or more embodiments disclosed. The method 200 may include splitting a compressed process fluid into a plurality of streams including a first stream of the compressed process fluid and a second stream of the compressed process fluid, as at 202. The method 200 may also include directing the first stream of the compressed process fluid to a gas turbine, as at 204. The method 200 may further include directing the second stream of the compressed process fluid to an expansion device operatively coupled to the gas turbine, as at 206.

The method 200 may also include expanding the second stream of the compressed process fluid in the expansion device to at least partially drive the gas turbine, as at 208. The method 200 may further include directing an expanded second stream of the compressed process fluid to the gas turbine, as at 210. The method 200 may also include cooling the one or more components of the gas turbine with the expanded second stream of the compressed process fluid, as at 212.

In one or more embodiments, the method 200 may include also include expanding the first stream of the compressed process fluid in the gas turbine to rotate a rotor shaft of the gas turbine, directing a third stream of the compressed process fluid to the gas turbine, and cooling the one or more components of the gas turbine with the third stream of the compressed process fluid. The gas turbine may include a combustor and a power turbine, the combustor having a combustion liner and the power turbine including at least one stage. The at least one stage may include a plurality of stationary vanes and a plurality of rotor blades mounted circumferentially about the rotor shaft and disposed downstream from the plurality of stationary vanes. The one or more components may be at least one of a combustion liner, a stationary vane, and a rotor blade.

In another embodiment, as provided in the method 200, directing the expanded second stream of the compressed process fluid to the gas turbine may further include reducing a pressure of the expanded second stream of working fluid via a throttle valve or a restricted orifice. In yet another embodiment, as provided in the method 200, directing the expanded second stream of the compressed process fluid to the gas turbine may further include fluidly coupling one or more stages of the expansion device to one or more stages of a power turbine of the gas turbine via respective conduits, each conduit flowing therethrough a portion of the expanded second stream of the compressed process fluid.

It should be appreciated that all numerical values and ranges disclosed herein are approximate valves and ranges, whether "about" is used in conjunction therewith. It should also be appreciated that the term "about," as used herein, in conjunction with a numeral refers to a value that is +/-5% (inclusive) of that numeral, +/-10% (inclusive) of that numeral, or +/-15% (inclusive) of that numeral. It should further be appreciated that when a numerical range is disclosed herein, any numerical value falling within the range is also specifically disclosed.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A gas turbine assembly, comprising:
   a gas turbine operatively coupled to a compressed air energy storage (CAES) system, the CAES system having a compressor unconnected from the gas turbine, the compressor arranged to be driven by an electric motor to compress a process fluid during off-peak hours and supply a compressed process fluid to a storage unit for storage, the CAES system further having a generator connected to the gas turbine to generate electrical power and supply generated electrical power to an electric grid during peak hours, the gas turbine comprising:
      a combustor configured to directly receive a first stream of the compressed process fluid from the storage unit, mix a fuel with the first stream of the compressed process fluid to form a mixture, and combust the mixture to form a combustion product, and
      a power turbine configured to receive and expand the combustion product to convert a pressure drop of the combustion product to mechanical energy;
   an expansion device configured to receive and expand a second stream of the compressed process fluid to convert a pressure drop of the second stream of the compressed process fluid to mechanical energy, the expansion device operatively coupled to the power turbine and configured to at least partially drive the power turbine with the mechanical energy converted from the pressure drop of the second stream of the compressed process fluid; and
   a plurality of conduits fluidly coupling the power turbine and the expansion device and configured to direct the second stream of the compressed process fluid expanded in the expansion device to the power turbine to cool one or more components of the power turbine.

2. The gas turbine assembly of claim 1, wherein the power turbine comprises a plurality of stages, each stage comprising a plurality of stationary vanes and a plurality of rotor blades mounted circumferentially about a rotor shaft and disposed downstream from the plurality of stationary vanes, wherein the plurality of stator vanes are configured to direct the combustion product into contact with the plurality of rotor blades, thereby imparting a rotational force on the rotor shaft.

3. The gas turbine assembly of claim 2, wherein the one or more components comprise the plurality of stator vanes of at least one stage of the plurality of stages.

4. The gas turbine assembly of claim 2, wherein the one or more components comprise the plurality of rotor blades of at least one stage of the plurality of stages.

5. The gas turbine assembly of claim 3, wherein:
   the expansion device comprises a plurality of stages, each stage comprising a plurality of stationary vanes and a plurality of rotor blades mounted circumferentially about the rotor shaft and disposed downstream from the plurality of stationary vanes, wherein the plurality of stator vanes are configured to direct the combustion product into contact with the plurality of rotor blades, thereby imparting a rotational force on the rotor shaft; and
   one or more conduits of the plurality of conduits are fluidly coupled to at least one stage of the expansion device.

6. The gas turbine assembly of claim 5, wherein at least one conduit comprises a throttle valve or a restricted orifice for adjusting a pressure in the one or more conduits.

7. The gas turbine assembly of claim 1, further comprising a gas turbine assembly inlet configured to receive the compressed process fluid from the compressor of the CAES system and to separate the compressed process fluid into the first stream of the compressed process fluid, the second stream of the compressed process fluid, and a third stream of the compressed process fluid.

8. The gas turbine assembly of claim 7, wherein a cooling line fluidly couples the power turbine and the inlet of the gas turbine assembly, the cooling line configured to direct the third stream of the compressed process fluid to the power turbine to cool the one or more components of the power turbine.

9. The system of claim 1, wherein the storage unit comprises a cavern or a vessel.

10. A system for cooling one or more components of a gas turbine, comprising:
   an expansion device operatively coupled to the gas turbine and configured to convert a pressure drop of a stream of a compressed process fluid to mechanical energy, the expansion device further configured to at least partially drive the gas turbine with the mechanical energy;
   one or more conduits fluidly coupling the expansion device and the gas turbine, the one or more conduits configured to direct an expanded stream of the compressed process fluid to the one or more components of the gas turbine to cool the one or more components.

wherein the gas turbine is operatively coupled to a compressed air energy storage (CAES) system, the CAES system having a compressor unconnected from the gas turbine, the compressor arranged to be driven by an electric motor to compress the process fluid during off-peak hours and supply the compressed process fluid to a storage unit for storage, the CAES system further having a generator connected to the gas turbine to generate electrical power and supply generated electrical power to an electric grid during peak hours; and a cooling line fluidly coupling a power turbine of the gas turbine with an inlet of a gas turbine assembly comprising the expansion device and the gas turbine, the cooling line configured to direct another stream of the compressed process fluid to the power turbine to cool the one or more components of the gas turbine.

11. The system of claim 10, wherein the one or more components comprise one or more stationary vanes of a power turbine of the gas turbine.

12. The system of claim 10, wherein the one or more components comprise one or more rotor blades of a power turbine of the gas turbine.

13. A system for cooling one or more components of a gas turbine, comprising:
an expansion device operatively coupled to the gas turbine and configured to convert a pressure drop of a stream of a compressed process fluid to mechanical energy, the expansion device further configured to at least partially drive the gas turbine with the mechanical energy;
one or more conduits fluidly coupling the expansion device and the gas turbine, the one or more conduits configured to direct an expanded stream of the compressed process fluid to the one or more components of the gas turbine to cool the one or more components,
wherein the gas turbine is operatively coupled to a compressed air energy storage (CAES) system, the CAES system having a compressor unconnected from the gas turbine, the compressor arranged to be driven by an electric motor to compress the process fluid during off-peak hours and supply the compressed process fluid to a storage unit for storage, the CAES system further having a generator connected to the gas turbine to generate electrical power and supply generated electrical power to an electric grid during peak hours; and
wherein each of the expansion device and a power turbine of the gas turbine comprises one or more stages, and each of the one or more conduits is configured to direct a portion of the expanded stream from a stage of the expansion device to a stage of the power turbine having a lower pressure and a higher temperature.

14. A method for cooling one or more components of a gas turbine, comprising:
fluidly coupling the gas turbine to receive a compressed process fluid from a storage unit;
splitting the received compressed process fluid into a plurality of streams including a first stream of the compressed process fluid and a second stream of the compressed process fluid;
directing the first stream of the compressed process fluid to the gas turbine;
directing the second stream of the compressed process fluid to an expansion device operatively coupled to the gas turbine;
expanding the second stream of the compressed process fluid in the expansion device to at least partially drive the gas turbine;
directing an expanded second stream of the compressed process fluid to the gas turbine;
cooling the one or more components of the gas turbine with the expanded second stream of the compressed process fluid;
wherein the gas turbine is operatively coupled to a compressed air energy storage (CAES) system, the CAES system having a compressor unconnected from the gas turbine, the compressor arranged to be driven by an electric motor to compress the process fluid during off-peak hours and supply a compressed process fluid to a storage unit for storage, the CAES system further having a generator connected to the gas turbine to generate electrical power and supply generated electrical power to an electric grid during peak hours;
expanding the first stream of the compressed process fluid in the gas turbine to rotate a rotor shaft of the gas turbine;
directing a third stream of the compressed process fluid to the gas turbine; and
further cooling the one or more components of the gas turbine with the third stream of the compressed process fluid.

15. The method of claim 14, wherein:
the gas turbine comprises a combustor and a power turbine, the combustor having a combustion liner and the power turbine including at least one stage, the at least one stage including a plurality of stationary vanes and a plurality of rotor blades mounted circumferentially about the rotor shaft and disposed downstream from the plurality of stationary vanes; and
the one or more components are selected from the group consisting of a combustion liner, a stationary vane, and a rotor blade.

16. The method of claim 14, wherein directing the expanded second stream of the compressed process fluid to the gas turbine further comprises:
reducing a pressure of the expanded second stream of working fluid via a throttle valve or a restricted orifice.

17. The method of claim 14, wherein directing the expanded second stream of the compressed process fluid to the gas turbine further comprises:
fluidly coupling one or more stages of the expansion device to one or more stages of a power turbine of the gas turbine via respective conduits, each conduit flowing therethrough a portion of the expanded second stream of the compressed process fluid.

* * * * *